(12) United States Patent
Raikar et al.

(10) Patent No.: US 10,604,104 B2
(45) Date of Patent: Mar. 31, 2020

(54) FRONT AND REAR DEPLOYABLE CONTAINMENT SYSTEM

(71) Applicant: GM Global Technology Operations LLC, Detroit, MI (US)

(72) Inventors: Sadanand N. Raikar, Karnataka (IN); Jeffrey J. Schultz, Grand Blanc, MI (US); Jeffrey W. Ronne, Shelby Township, MI (US); Stephen J. Cassatta, Wixom, MI (US); Mukesh Amin, Canton, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 186 days.

(21) Appl. No.: 15/936,721

(22) Filed: Mar. 27, 2018

(65) Prior Publication Data
US 2019/0299919 A1 Oct. 3, 2019

(51) Int. Cl.
| | |
|---|---|
| B60R 21/16 | (2006.01) |
| B60R 21/262 | (2011.01) |
| B60R 21/0134 | (2006.01) |
| B60R 21/232 | (2011.01) |
| B60R 21/215 | (2011.01) |
| B60R 21/231 | (2011.01) |
| B60R 21/00 | (2006.01) |

(52) U.S. Cl.
CPC ........ *B60R 21/262* (2013.01); *B60R 21/0134* (2013.01); *B60R 21/215* (2013.01); *B60R 21/232* (2013.01); *B60R 21/23184* (2013.01); *B60R 2021/0067* (2013.01); *B60R 2021/21518* (2013.01)

(58) Field of Classification Search
CPC ............ B60R 21/262; B60R 21/23184; B60R 21/232; B60R 21/0136; B60R 21/0134; B60R 21/215; B60R 2021/21518; B60R 2021/0011; B60R 2021/0004; B60R 2021/0067
USPC ........................................... 280/728.1, 728.2
See application file for complete search history.

(56) References Cited

U.S. PATENT DOCUMENTS

| | | | | |
|---|---|---|---|---|
| 5,005,899 | A * | 4/1991 | Clenet | B60J 7/0038 296/214 |
| 7,909,356 | B2 * | 3/2011 | Ilda | B60R 21/214 280/728.2 |
| 9,771,048 | B2 * | 9/2017 | Min | B60R 21/214 |
| 10,173,503 | B2 * | 1/2019 | Ten-Jet-Foei | B60J 7/067 |
| 10,399,527 | B2 * | 9/2019 | Schutt | B60R 21/08 |
| 10,449,923 | B2 * | 10/2019 | Son | B60R 21/233 |

(Continued)

OTHER PUBLICATIONS

U.S. Appl. No. 15/813,589, filed Nov. 15, 2017, Raikar et al.

*Primary Examiner* — Toan C To

(57) ABSTRACT

A deployable containment system of a vehicle includes a pair of guide channels that surround an opening facing one of a forward direction of travel of the vehicle and a backward direction of travel of the vehicle. Each of the guide channels has a first end and a second end. A housing is mounted to the first ends of the guide channels. A shield is configured to: deploy from the housing; travel along the guide channels toward the second ends of the guide channels; and cover at least a portion of the opening, An actuator is configured to, in response to being triggered, deploy the shield from the housing and move the shield along the guide channels toward the second ends of the guide channels.

20 Claims, 16 Drawing Sheets

(56) References Cited

U.S. PATENT DOCUMENTS

| | | | | |
|---|---|---|---|---|
| 2004/0239083 A1* | 12/2004 | Mori | ................ | B60R 21/232 |
| | | | | 280/730.1 |
| 2006/0055153 A1* | 3/2006 | Hirata | ................ | B60N 2/42709 |
| | | | | 280/728.1 |
| 2006/0214401 A1* | 9/2006 | Hirata | ................ | B60R 21/232 |
| | | | | 280/730.1 |

* cited by examiner

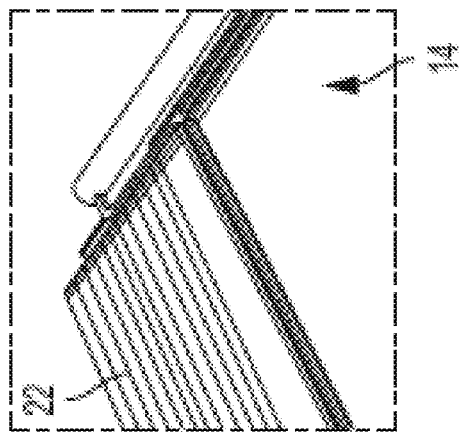
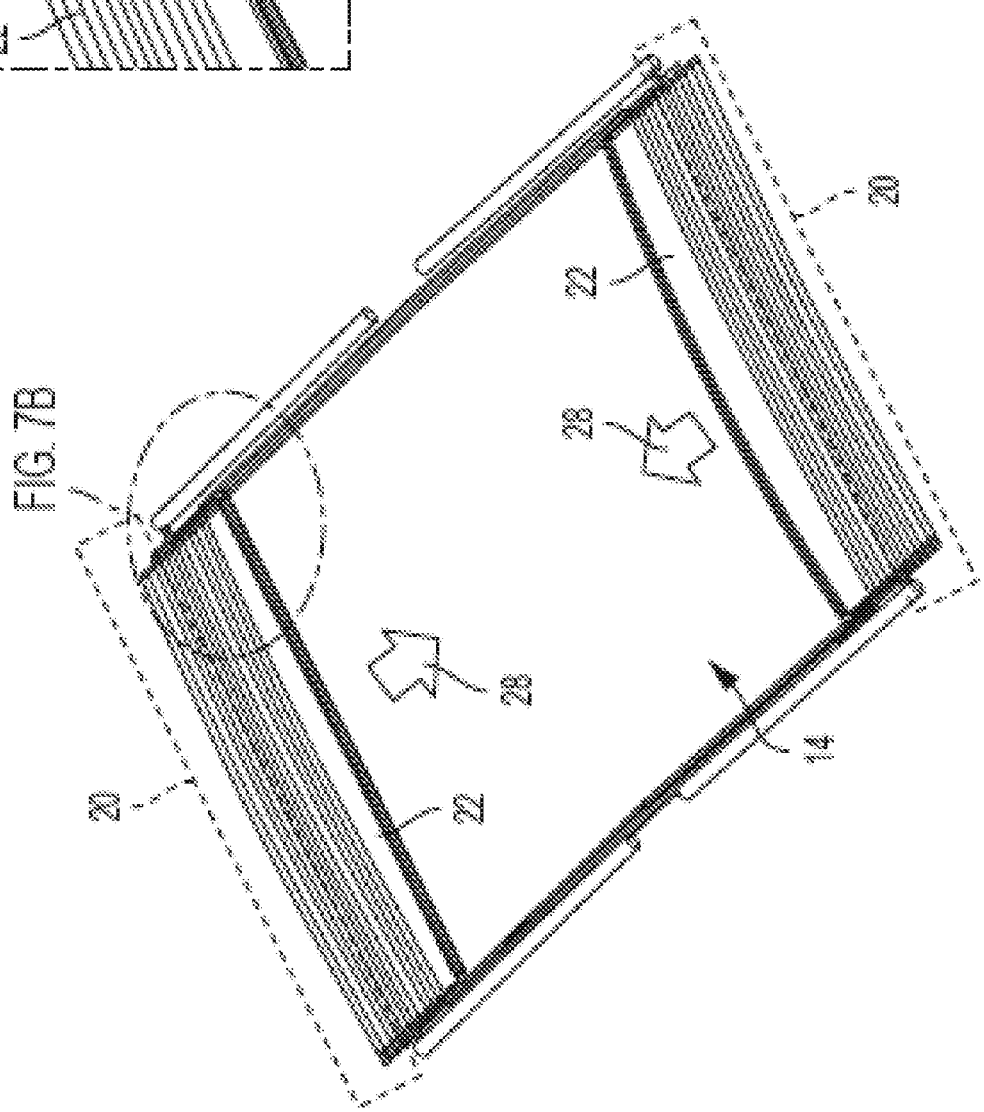

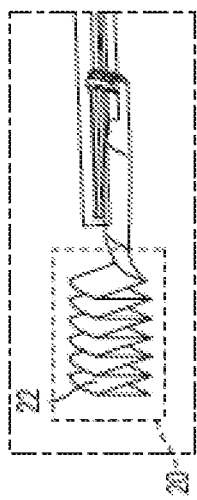
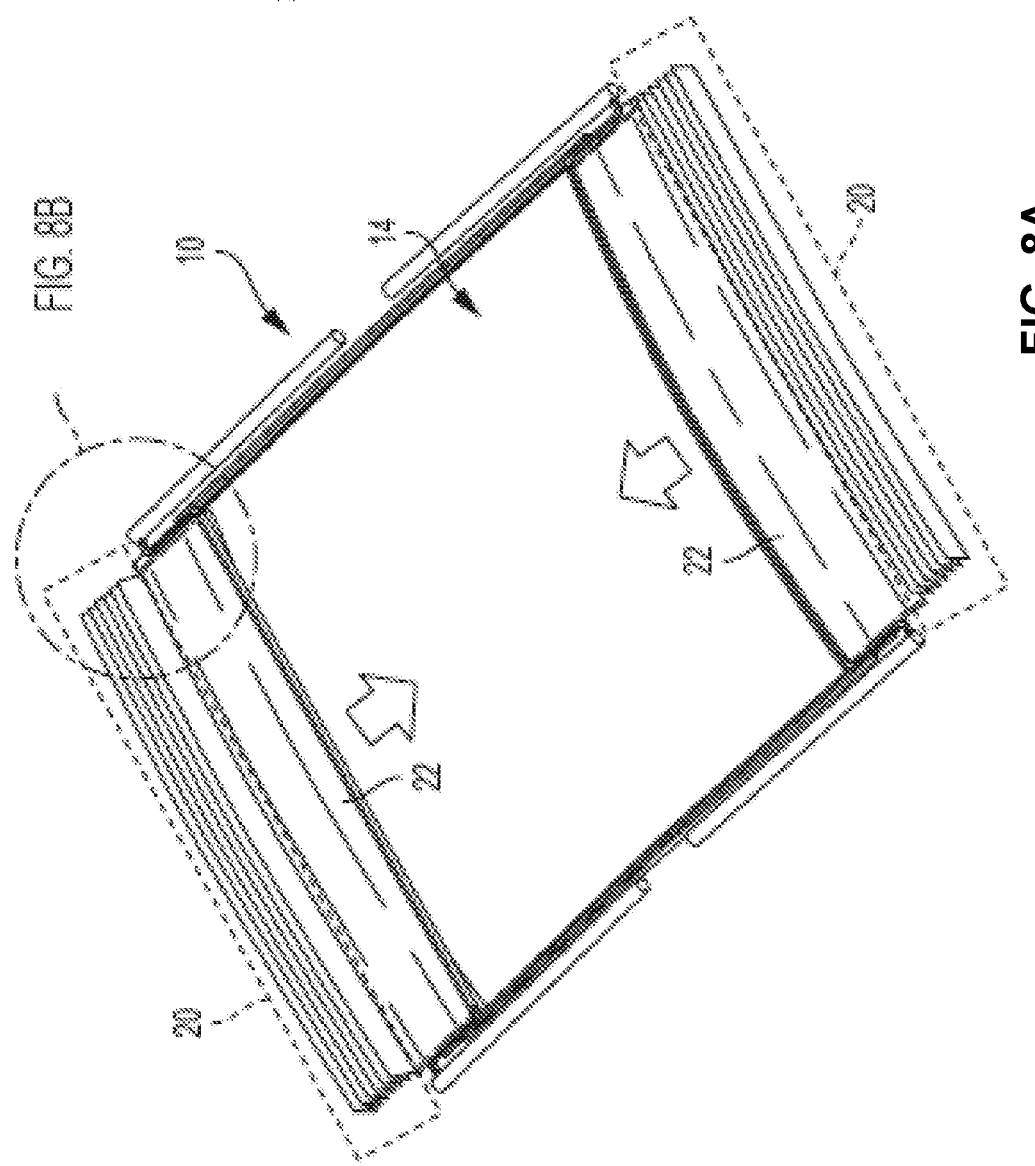
FIG. 8B
FIG. 8A

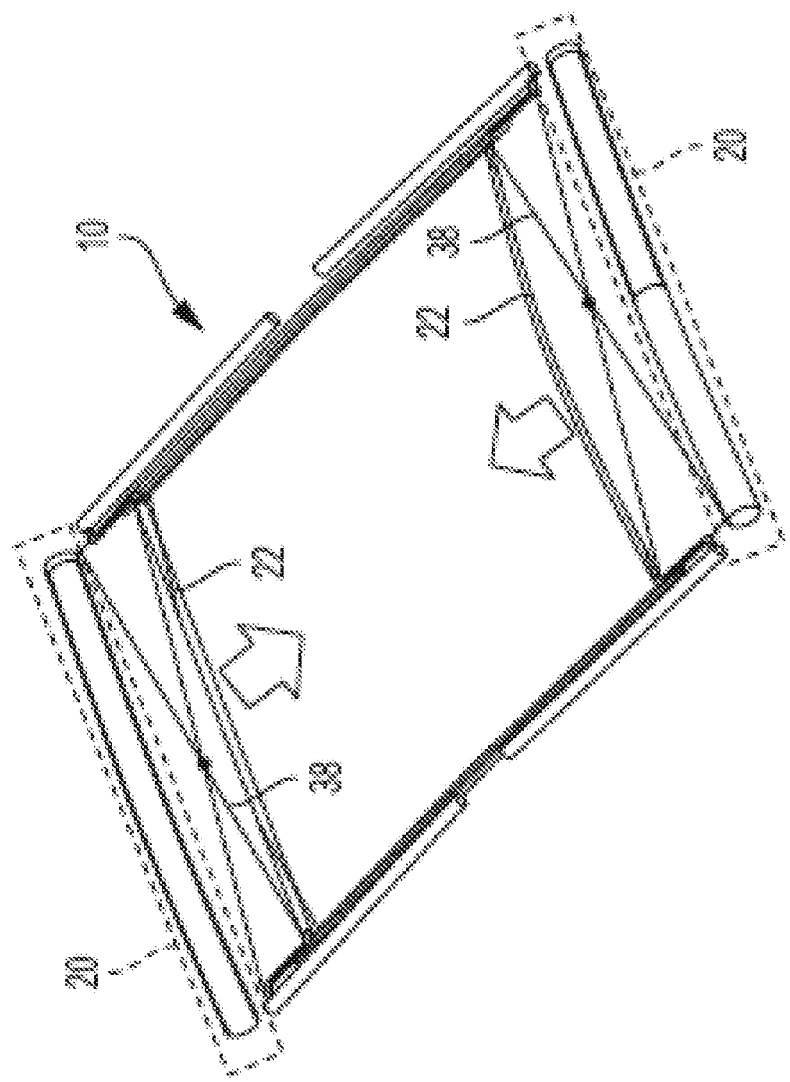

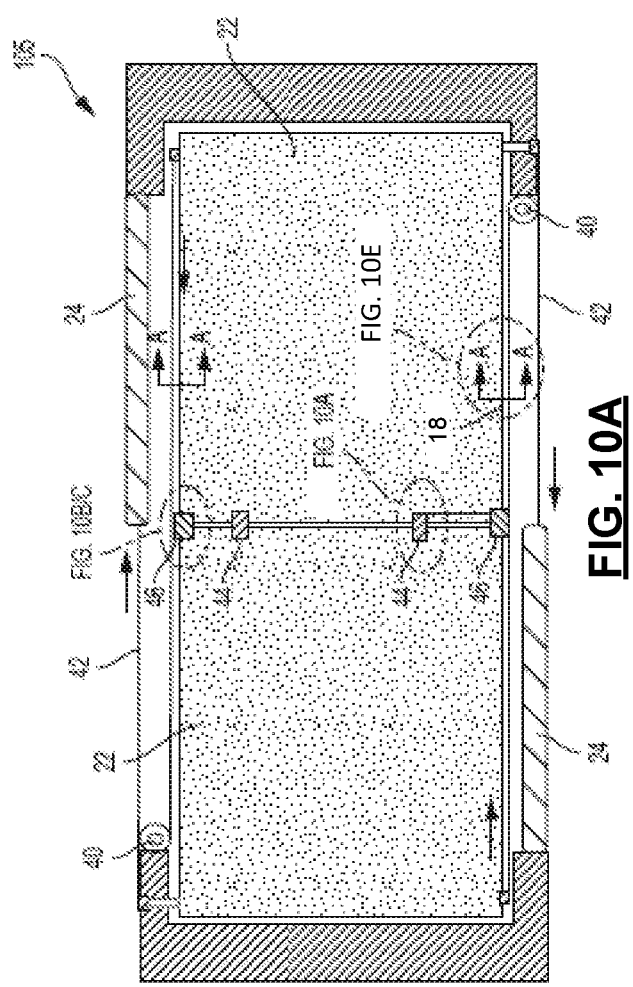
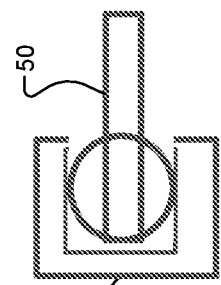
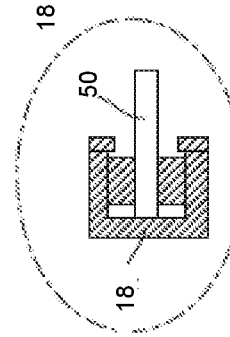
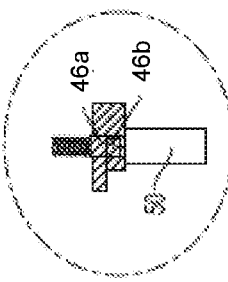
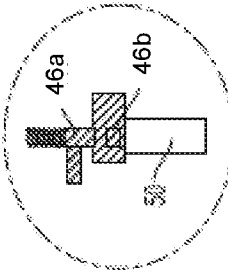
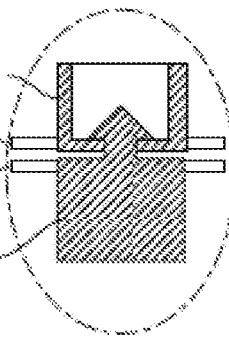

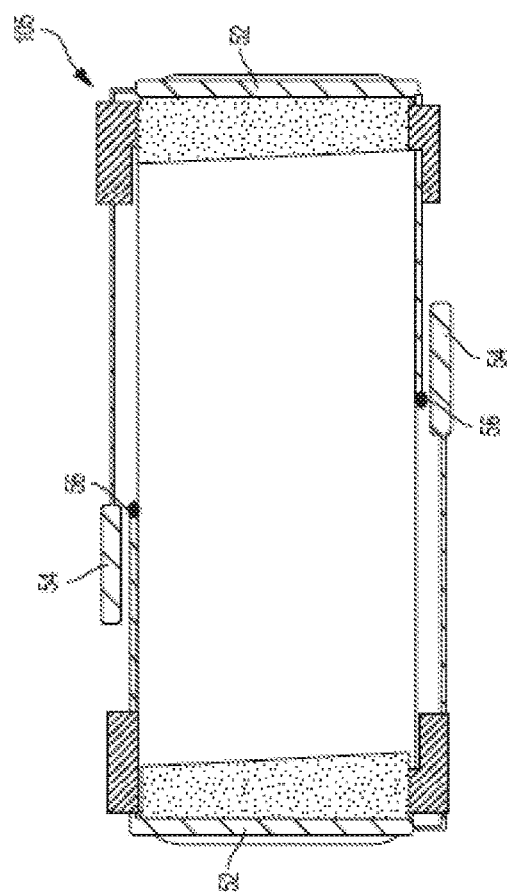
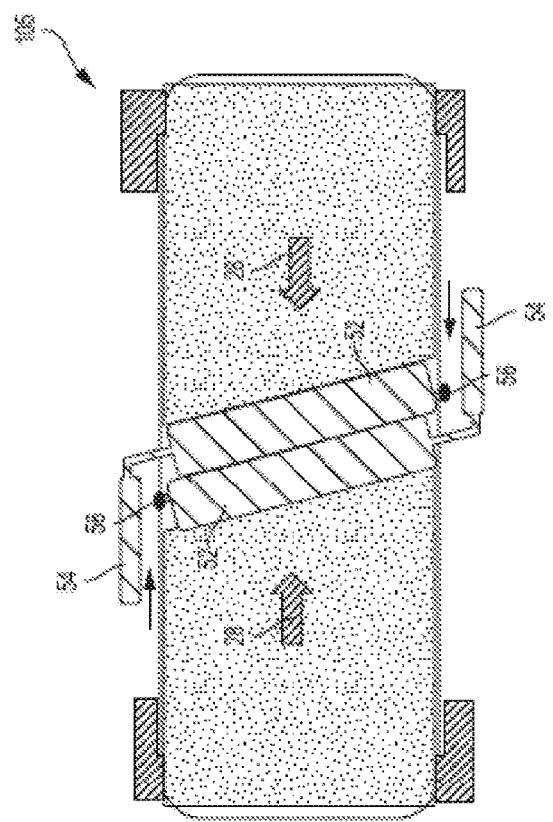
FIG. 11A
FIG. 11B

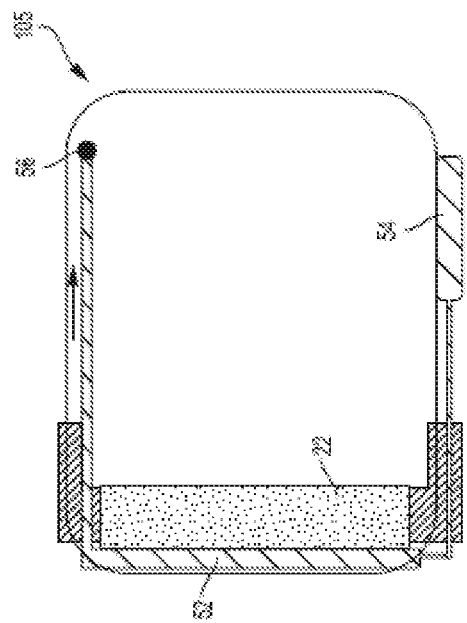
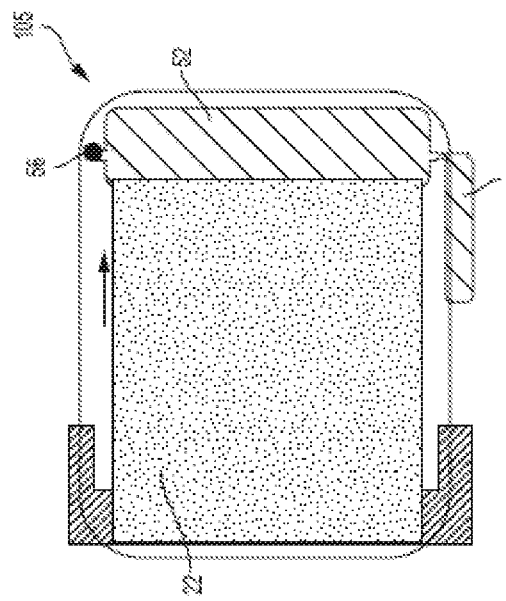
FIG. 12A
FIG. 12B

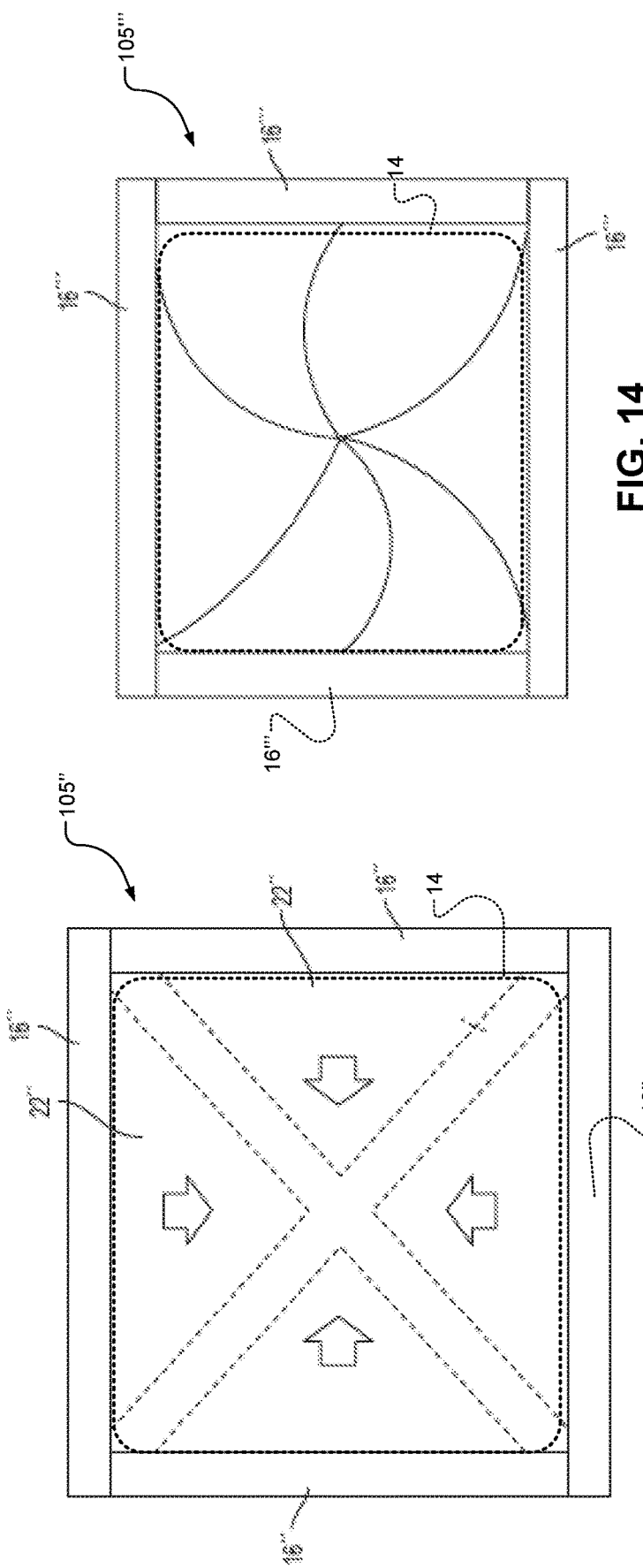

FRONT AND REAR DEPLOYABLE CONTAINMENT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Various occupant restraint devices are available in vehicles. For example, vehicles include seat belts that restrain movement of vehicle occupants during a crash event. Seat belts are located at each designated seating position and may be designed to accommodate a large range of occupant sizes.

Another type of occupant restraint device is a system of one or more airbags. For example, an airbag may be implemented within a steering wheel of the vehicle. Upon detection of a frontal collision, the airbag within the steering wheel may be deployed in an effort to manage the energy of the driver of the vehicle due to the crash forces.

SUMMARY

The present disclosure relates to occupant restraint systems of vehicles and more particularly systems and methods for deploying containment systems for front and rear facing openings of vehicles.

In a feature, a deployable containment system of a vehicle is described. A pair of guide channels surround an opening facing one of a forward direction of travel of the vehicle and a backward direction of travel of the vehicle. Each of the guide channels has a first end and a second end. A housing is mounted to the first ends of the guide channels. A shield is configured to: deploy from the housing; travel along the guide channels toward the second ends of the guide channels; and cover at least a portion of the opening. An actuator is configured to, in response to being triggered, deploy the shield from the housing and move the shield along the guide channels toward the second ends of the guide channels.

In further features, one or more locking mechanisms are configured to lock when the shield has covered at least the portion of the opening.

In further features, the actuator comprises a spring configured to urge the shield toward the second ends of the guide channels.

In further features, the actuator comprises a pyrotechnic device configured to ignite and deploy the shield.

In further features, the actuator comprises an inflator configured to inflate and urge the shield toward the second ends of the guide channels.

In further features, the shield is wound around a winding shaft while in the housing and unwinds during deployment.

In further features, a deployment module is configured to trigger the actuator in response to identification of an impact event of a front end of the vehicle with an object.

In further features, at least one of a radar sensor, a camera, and a light imaging distance and ranging (LIDAR) sensor is configured to identify objects in the one of the forward direction of travel of the vehicle and the backward direction of travel of the vehicle. A triggering module is configured to identify the impact event of the front end of the vehicle with the object based on signals from the at least one of the radar sensor, the camera, and the LIDAR sensor.

In further features, a deployment module is configured to trigger the actuator in response to identification of an impact event of a rear end of the vehicle with an object.

In further features, at least one of a radar sensor, a camera, and a light imaging distance and ranging (LIDAR) sensor is configured to identify objects in the one of the forward direction of travel of the vehicle and the backward direction of travel of the vehicle. A triggering module is configured to identify the impact event of the rear end of the vehicle with the object based on signals from the at least one of the radar sensor, the camera, and the LIDAR sensor.

In further features, a second actuator is configured to, in response to being triggered, in cooperation with the actuator, deploy the shield from the housing and move the shield along the guide channels toward the second ends of the guide channels.

In further features, a second housing is mounted to the second ends of the guide channels. A second shield is configured to: deploy from the second housing; travel along the guide channels toward the first ends of the guide channels; and cover at least a second portion of the opening. A second actuator is configured to, in response to being triggered, deploy the second shield from the second housing and move the second shield along the guide channels toward the first ends of the guide channels.

In further features, a front windshield that is located within the opening.

In further features, the opening faces the forward direction of travel of the vehicle. A second deployable containment system includes a second pair of guide channels that surround a second opening facing the backward direction of travel of the vehicle. Each guide channel of the second pair of guide channels has a third end and a fourth end. A second housing is mounted to the third ends of the guide channels of the second pair of guide channels. A second shield is configured to: deploy from the second housing; travel along the guide channels of the second pair of guide channels toward the fourth ends of the guide channels of the second pair of guide channels; and cover at least a portion of the second opening. A second actuator is configured to, in response to being triggered, deploy the second shield from the second housing and move the second shield along the guide channels of the second pair of guide channels toward the fourth ends of the guide channels of the second pair of guide channels.

In further features, a deployment module is configured to trigger the actuator and the second actuator in response to identification of one of: a first impact event of a front end of the vehicle with a first object; and a second impact event of a rear end of the vehicle with a second object.

In further features, at least one of a radar sensor, a camera, and a light imaging distance and ranging (LIDAR) sensor is configured to identify objects in the one of the forward direction of travel of the vehicle and the backward direction of travel of the vehicle. A triggering module is configured to identify the first impact event of the front end of the vehicle with the first object and the second impact event of the rear end of the vehicle with the second object based on signals from the at least one of the radar sensor, the camera, and the LIDAR sensor.

In further features, a deployment module is configured to, in response to identification of an impact event of a front end of the vehicle with an object, trigger the actuator and not trigger the second actuator.

In further features, a deployment module is configured to, in response to identification of an impact event of a rear end of the vehicle with an object, not trigger the actuator and trigger the second actuator.

In further features, a third housing mounted to the second ends of the guide channels. A third shield is configured to: deploy from the third housing; travel along the guide channels toward the first ends of the guide channels; and cover at least a second portion of the opening. A third actuator is configured to, in response to being triggered, deploy the third shield from the third housing and move the third shield along the guide channels toward the first ends of the guide channels. A fourth housing is mounted to the fourth ends of the guide channels of the second pair of guide channels. A fourth shield is configured to: deploy from the fourth housing; travel along the guide channels of the second pair of guide channels toward the third ends of the guide channels of the second pair of guide channels; and cover at least a second portion of the second opening. A fourth actuator is configured to, in response to being triggered, deploy the fourth shield from the fourth housing and move the fourth shield along the guide channels of the second pair of guide channels toward the third ends of the guide channels of the second pair of guide channels.

In a feature, a vehicle includes a first pair of guide channels that surround a first opening facing a forward direction of travel of the vehicle. Each guide channel of the first pair of guide channels has a first end and a second end. A first housing mounted to the first ends of the guide channels. A first shield is configured to: deploy from the first housing; travel along the guide channels toward the second ends of the first guide channels; and cover at least a portion of the first opening. A first actuator is configured to, in response to being triggered, deploy the first shield from the first housing and move the first shield along the first guide channels toward the second ends of the first guide channels. A second pair of guide channels surround a second opening facing a backward direction of travel of the vehicle. Each guide channel of the second pair of guide channels has a third end and a fourth end. A second housing is mounted to the third ends of the guide channels of the second pair of guide channels. A second shield is configured to: deploy from the second housing; travel along the guide channels of the second pair of guide channels toward the fourth ends of the guide channels of the second pair of guide channels; and cover at least a portion of the second opening. A second actuator is configured to, in response to being triggered, deploy the second shield from the second housing and move the second shield along the guide channels of the second pair of guide channels toward the fourth ends of the guide channels of the second pair of guide channels. A deployment module is configured to trigger at least one of the first actuator and the second actuator in response to identification of an impact event of one of a front end of the vehicle with an object and a rear end of the vehicle with an object. At least one of a radar sensor, a camera, and a light imaging distance and ranging (LIDAR) sensor is configured to identify objects in the forward direction of travel of the vehicle and objects in the backward direction of travel of the vehicle. A triggering module is configured to identify the impact event based on signals from the at least one of the radar sensor, the camera, and the LIDAR sensor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7A shows a perspective view of another an example containment system;

FIG. 7B shows a perspective view of an example shield;

FIG. 8A shows a perspective view of an example containment system;

FIG. 8B shows a side view of an example shield;

FIG. 9 shows a perspective view of an example containment system;

FIG. 10A shows a top-down view of an example containment system;

FIG. 10B-10D show example locking mechanisms;

FIG. 10E-10F show cross-sectional views of example guide channels and shields;

FIGS. 11A-11B show top-down views of an example containment system;

FIGS. 12A-12B show top-down views of an example containment system;

FIG. 13 shows a top-down view of an example containment system;

FIG. 14 shows a top-down view of an example containment system; and

In the drawings, reference numbers may be reused to identify similar and/or identical elements.

DETAILED DESCRIPTION

Vehicles may include one or more different types of containment systems. One type of containment system includes a windshield containment system, such as a front containment system for a front windshield of a vehicle and a rear containment system for a rear windshield of a vehicle. The front windshield fills an opening that faces a forward direction of travel of the vehicle. The rear windshield fills an opening that faces a backward direction of travel of the vehicle. The rear windshield may be a rear windshield, a rear back light, a rear window, or a rear daylight opening.

The present application describes a deployable containment system that is normally stowed within an interior trim panel of the vehicle. The deployable containment system includes one or more shields that are deployed inboard of a front or rear windshield of the vehicle. The shield(s) are deployed when a front or rear impact event of the vehicle occurs. When deployed, the shield(s) cover the opening for the front or rear windshield and may prevent objects from passing into the vehicle through the opening or out of the vehicle through the opening.

Figure 1:
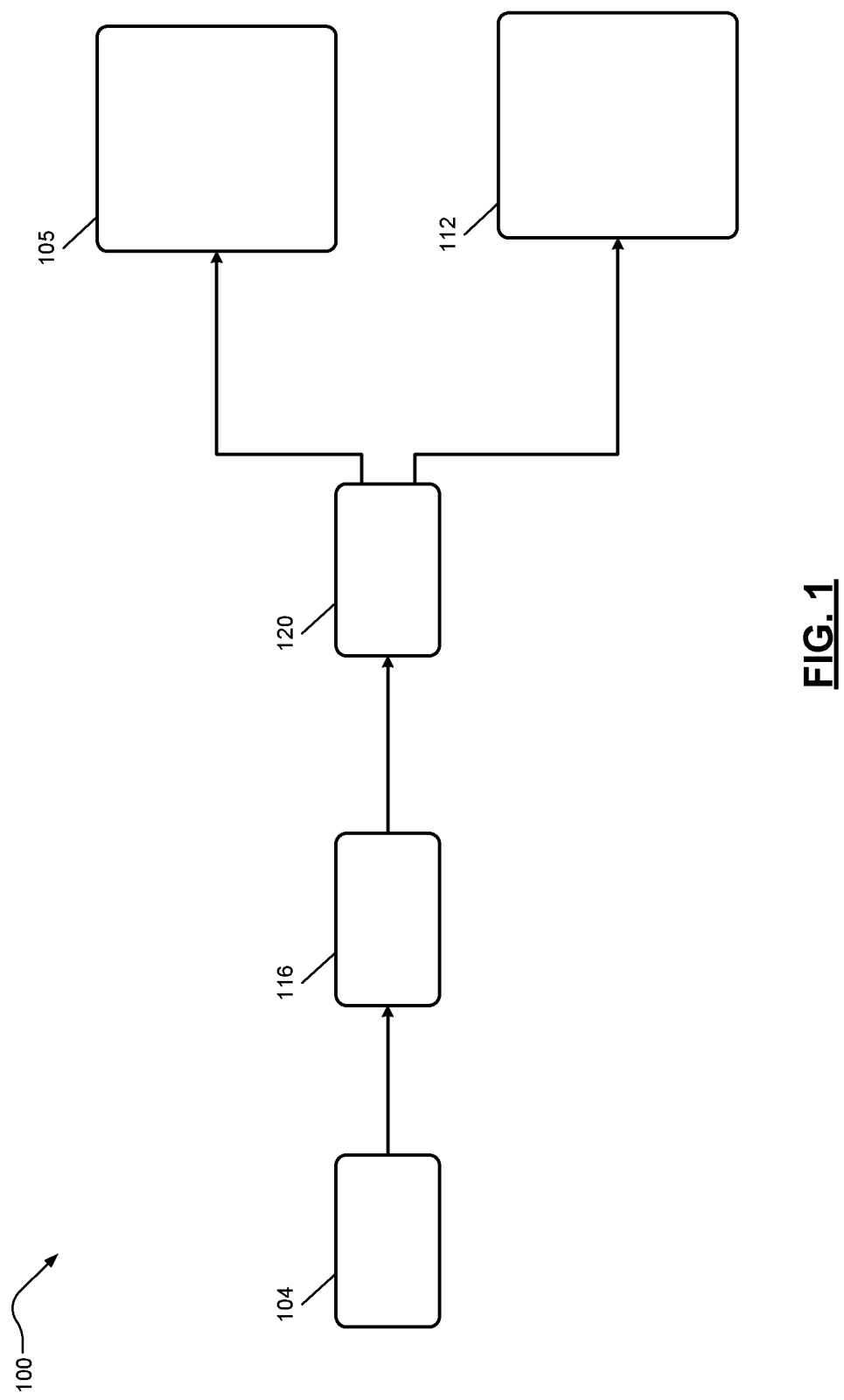
FIG. 1 shows a functional block diagram of an example a windshield containment system.

FIG. 1 is a functional block diagram of an example deployment containment system 100 of a vehicle. The vehicle may be, for example, a passenger vehicle (e.g., car, truck, utility vehicle, etc.) or another type of vehicle, such as a bus, van, boat, airplane, etc. The vehicle includes a plurality of sensors 104 that identify objects and detect frontal and rear impacts of the vehicle. The sensors 104 may include, for example, one or more cameras, one or more light detection and ranging (LIDAR) sensors, one or more radar sensors, one or more sonar sensors, one or more antilock braking system (ABS) sensors, one or more vehicle acceleration sensors, and/or one or more other types of sensors. Examples of cameras include forward facing cameras and rear facing cameras.

The vehicle includes one or more containment systems, such as a front containment system 105 and a rear containment system 112. Based on signals from the sensors 104, a triggering module 116 selectively triggers a deployment module 120 to deploy at least one of the front containment system 105 and the rear containment system 112.

The triggering module 116 triggers the deployment module 120 when a frontal impact of the vehicle is predicted or detected based on signals from the sensors 104. Additionally or alternatively, the triggering module triggers the deployment module 120 when a rear impact of the vehicle is predicted or detected based on signals from the sensors 104. Frontal impacts of the vehicle include the collisions of one or more objects with a front end of the vehicle. Rear impacts of the vehicle include the collisions of one or more objects with a rear end of the vehicle.

The deployment module 120 may trigger deployment of only the rear containment system 112 when a rear impact is predicted or detected. Alternatively, the deployment module 120 may trigger deployment of both of the front and rear containment systems 105 and 112 when a rear impact is predicted or detected.

The deployment module 120 may trigger deployment of only the front containment system 105 when a frontal impact is predicted or detected. Alternatively, the deployment module 120 may trigger deployment of both of the front and rear containment systems 105 and 112 when a frontal impact is predicted or detected.

Actuation of one or more actuators of the front containment system 105, deploy the front containment system 105. Actuation of one or more actuators of the rear containment system 112 deploy the rear containment system 112.

Figure 2A:
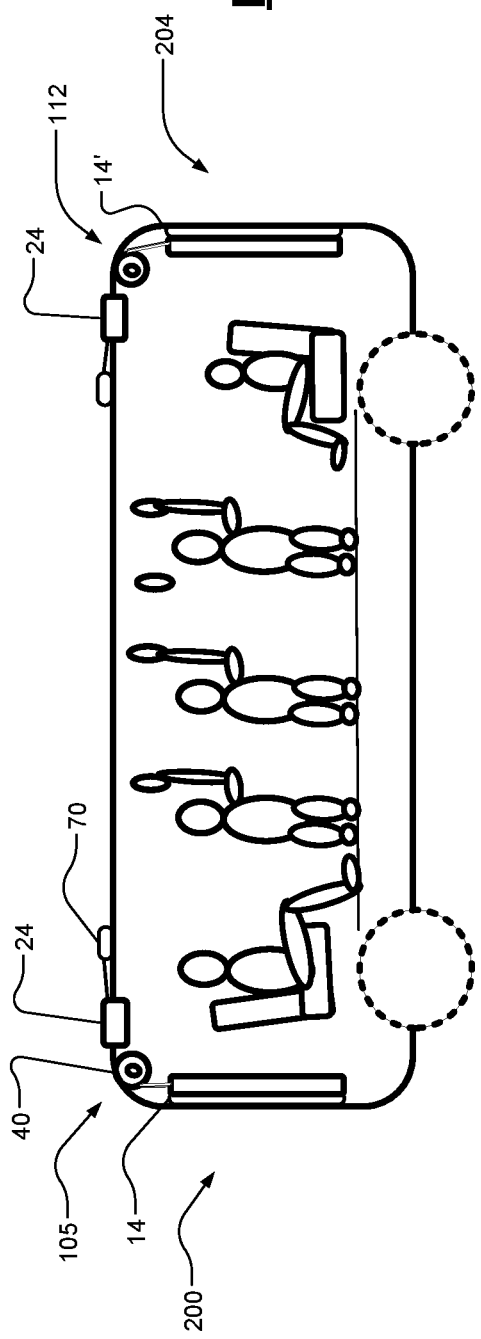
FIG. 2A shows a side view of a vehicle.
Figure 2B:
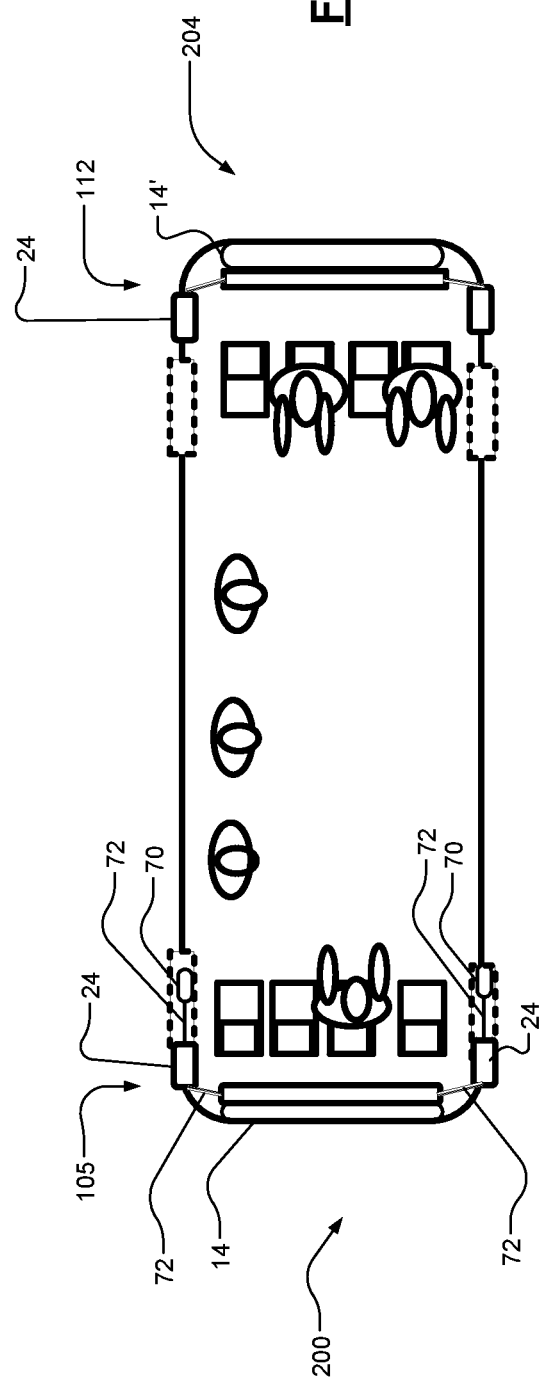
FIG. 2B shows a top-down environmental view of a vehicle.
Figure 2C:
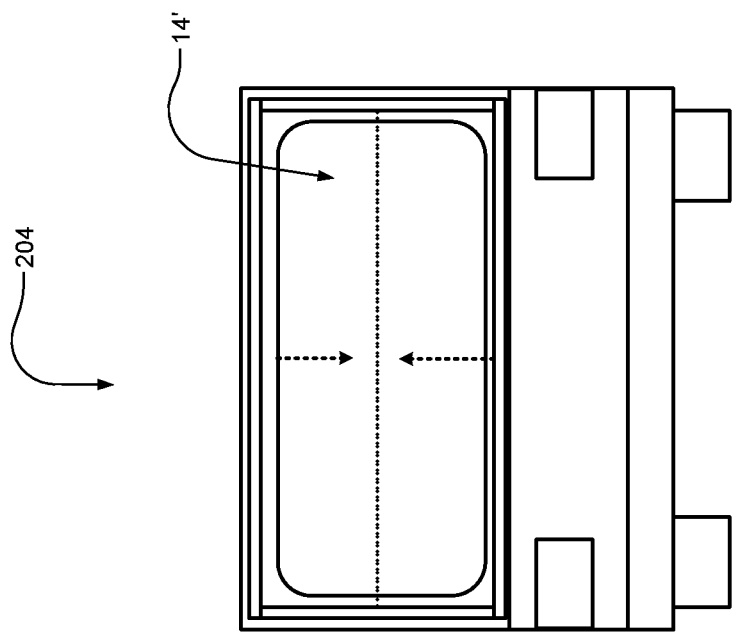
FIG. 2C shows a front view of a vehicle.
Figure 2D:
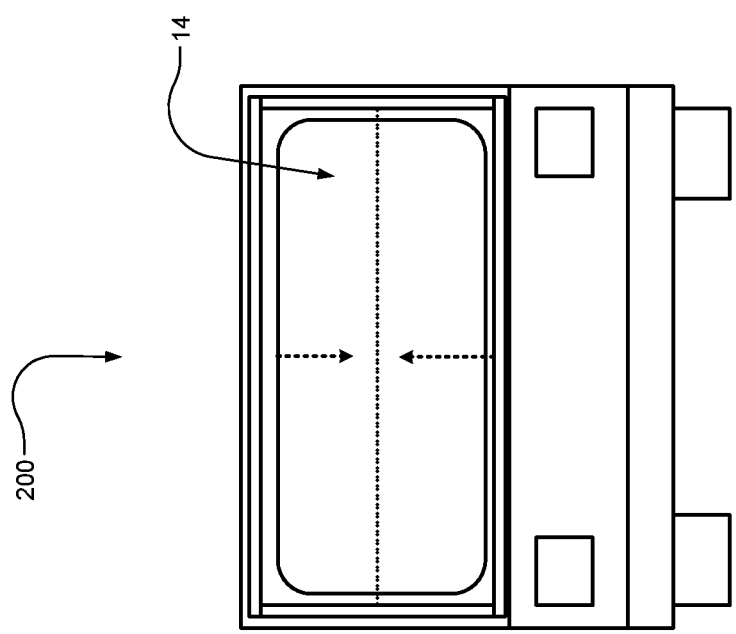
FIG. 2D shows a back end view of a vehicle.

FIG. 2A includes a side view of an example vehicle including a front end 200 and a rear end 204. FIG. 2B includes an example top view of the vehicle. FIG. 2C includes an example view of the front end 200 of the vehicle. FIG. 2D includes an example view of the rear end 204 of the vehicle. While the example vehicle is provided, the present disclosure is also applicable to other types of vehicles.

An example configuration of seats is shown in FIGS. 2A and 2B, however, the present disclosure is also applicable to other seating configurations. Seats of the vehicle may be fixed in position. In various implementations, one, more than one, or all of the seats may be rotatable and/or translatable (longitudinally and/or latitudinally). Seats of the vehicle may be positioned or positionable in more than two different (and non-parallel) directions. In various implementations, the vehicle may not include any front or rear crumple zones. For example, the vehicle may not include a front engine compartment, a front storage compartment, a rear engine compartment, or a rear storage compartment.

Figure 3:
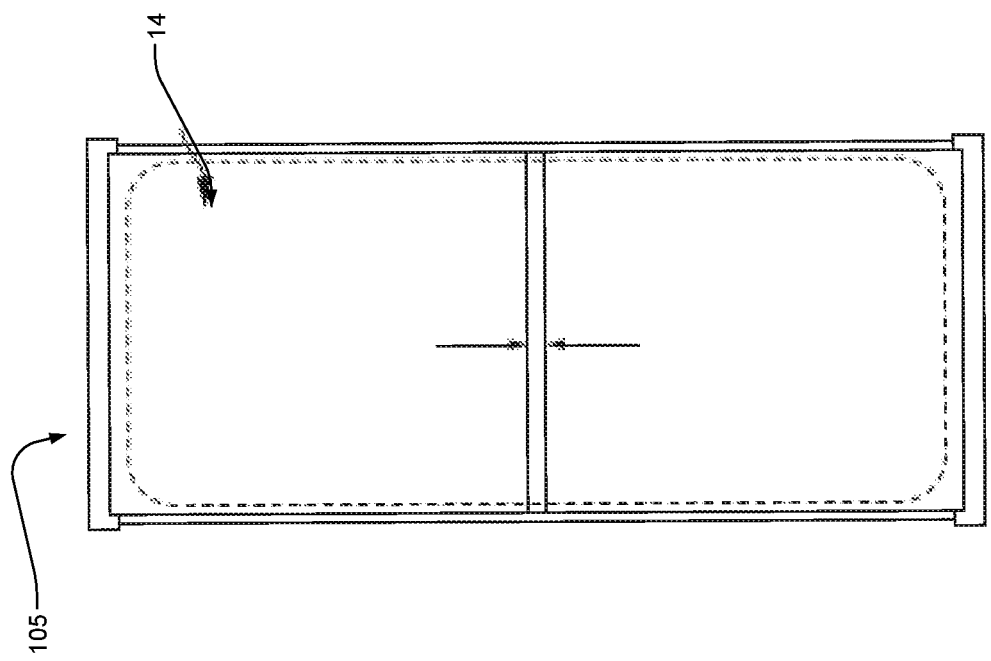
FIG. 3 shows a front view of an example containment system.

The deployment module 120 (FIG. 1) may generate a deployment signal when triggered by the triggering module 116. As shown in FIGS. 2C and 3, the deployment signal causes one or more actuators of the front containment system 105 to close two shields that, when closed, cover an opening 14 (a forward facing opening) of the vehicle. As such, the system provides a countermeasure to prevent occupant ejection through the opening 14 as well as to prevent external objects from entering into the vehicle cabin through the opening 14. A front windshield may be held within the opening 14. While the example of the shields closing vertically (up and down) is provided, the shields may alternatively close laterally (left and right). Forward facing may refer to a direction of travel of the vehicle when a transmission of the vehicle is in a forward drive gear.

As shown in FIGS. 2D and 3, the deployment signal (or a separate deployment signal for the rear containment system 112) causes one or more actuators of the rear containment system 112 to close two shields that, when closed, cover an opening 14' (a rearward facing opening) of the vehicle. As such, the system provides a countermeasure to prevent occupant ejection through the opening 14' as well as to prevent external objects from entering into the vehicle cabin through the opening 14'. A rear windshield may be held within the opening 14'. While the example of the shields closing vertically (up and down) is provided, the shields may alternatively close laterally (left and right). Rear or backward may refer to a direction of travel of the vehicle when a transmission of the vehicle is in a reverse drive gear.

While the example of the front containment system 105 will be discussed, the following is also applicable to the rear containment system.

As shown in FIGS. 4A through 4D, an example portion of the front containment system 105 includes a pair of identical Deployable Containment System (DCS) modules 16 located at opposite ends of a pair of guide channels 18 (i.e., a first and second end of the guide channels 18) that are installed on opposite sides of the opening 14. In various implementations, the guide channels 18 may be parallel. Each of the DCS modules 16 includes a housing 20 with a shield 22 located therein. Each of the housings 20 may be installed onto the interior side (e.g., beneath upholstery) of the vehicle or may be installed on the exterior of the vehicle. Moreover, each of the housings 20 maybe constructed of a rigid material such as, but not limited to, plastic, metal, or fiberglass.

Each of the shields 22 is configured to deploy from its respective one of the housings 20 and is operatively connected to an actuator 24, such as via a pin 26. After the actuating the actuators 24, the shields 22 deploy from their respective housings 20 and travel along the guide channels 18, as illustrated by 28, until they meet in a middle location of the guide channels 18 and fully block off the opening 14. With additional reference to FIG. 4B, the shields 22 may be made of a flexible material (e.g., plastic, fabric, Teflon, etc.) and may be wound into a roll shape around a winding shaft 30 located centrally within the housing 20. Upon being deployed from the housings 20, the shields 22 are drawn from the rotating winding shafts 30 and can travel via the guide channels 18.

Figure 4B:
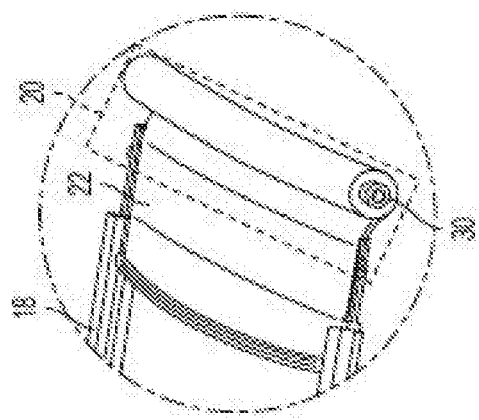
FIGS. 4A-4C show perspective views of an example containment system.
Figure 4A:
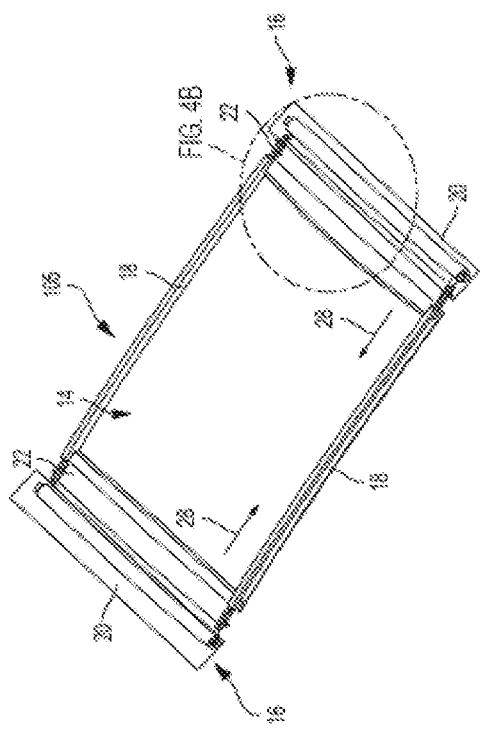
Figure 4C:
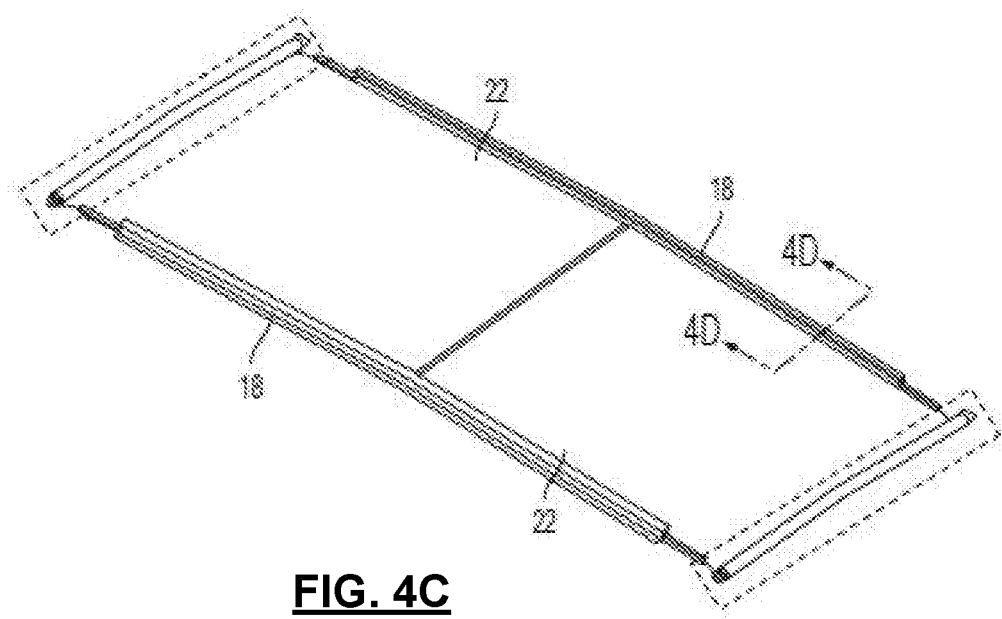
Figure 4D:
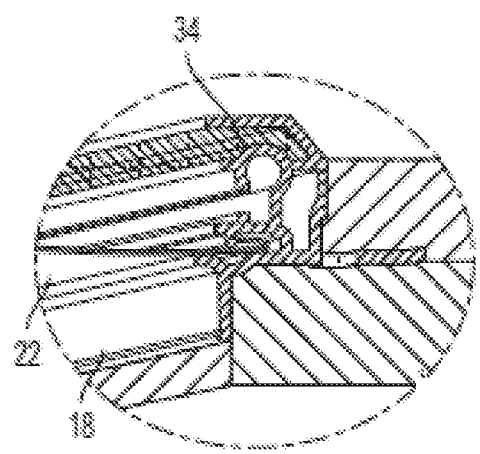
FIG. 4D shows a perspective cross-sectional view of an example guide channel.

With additional reference to FIG. 4D, the guide channels 18 can be installed at the edges of structural members of the vehicle that define the opening 14. As shown, each of the guide channels 18 may have multiple separate channels such that a pane of glass 34 (the front windshield) is installed in one channel that is located externally to the guide channel 18 in which the shields 22 travel. This configuration may ensure that the glass 34 is restricted from traveling into the vehicle interior after deployment of the shields 22.

Figure 5B:
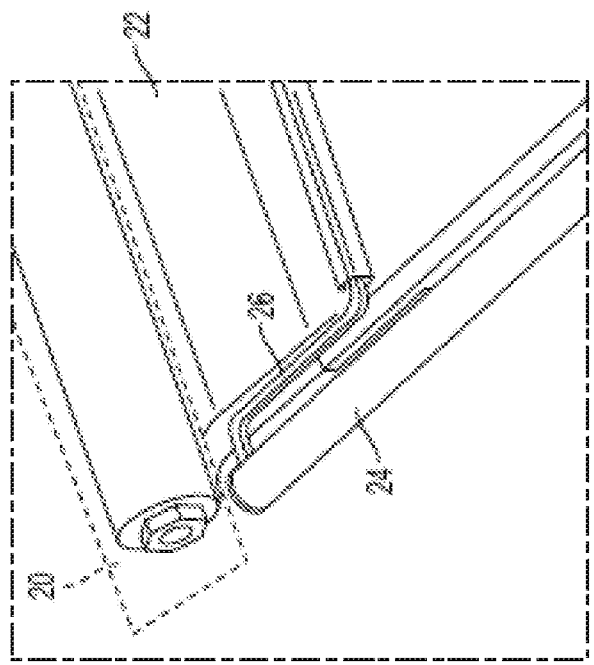
FIG. 5B shows a perspective view of an example actuator.
Figure 5A:
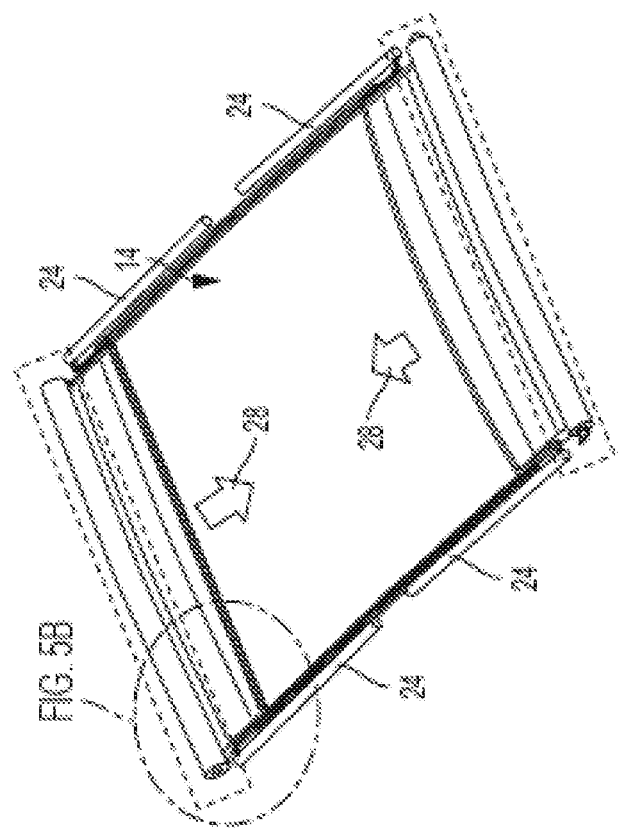
FIG. 5A shows a perspective view of an example containment system.

As shown in FIGS. 5A and 5B, the front containment system 105 may include four identical actuators 24, each being in proximity from the external sides of the guide channels 18 (e.g., approximately an inch) and at one of the channel ends. The actuators 24 are located surrounding the opening 14. The deployment module 120 controls actuation of the actuators 24 and thus controls deployment of the shields 22 when a frontal or rear impact event occurs.

The actuators 24 may include pyrotechnic actuators that deploy the shields 22 from the corresponding ones of the housings 20. For example, each of the actuators 24 may include an elongated tube with a propulsion component located therein (e.g., inflammable gas). When the deployment signal is received, the actuators 24 ignite pyrotechnic devices that combust and create pressure. The pressure causes the pins 26 (and therefore the shields 22) to move along the guide channels 18 toward the middle location of the guide channels 18. This type of pyrotechnic actuator can be considered a normally-closed (NC) actuator.

Figure 6B:
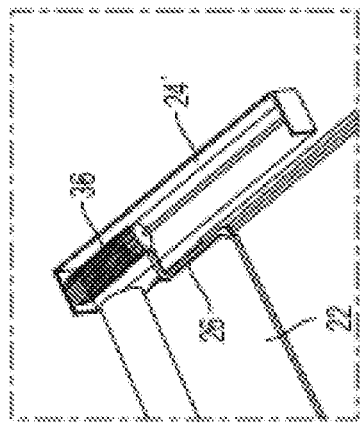
FIG. 6B shows a perspective view of an example actuator.
Figure 6A:
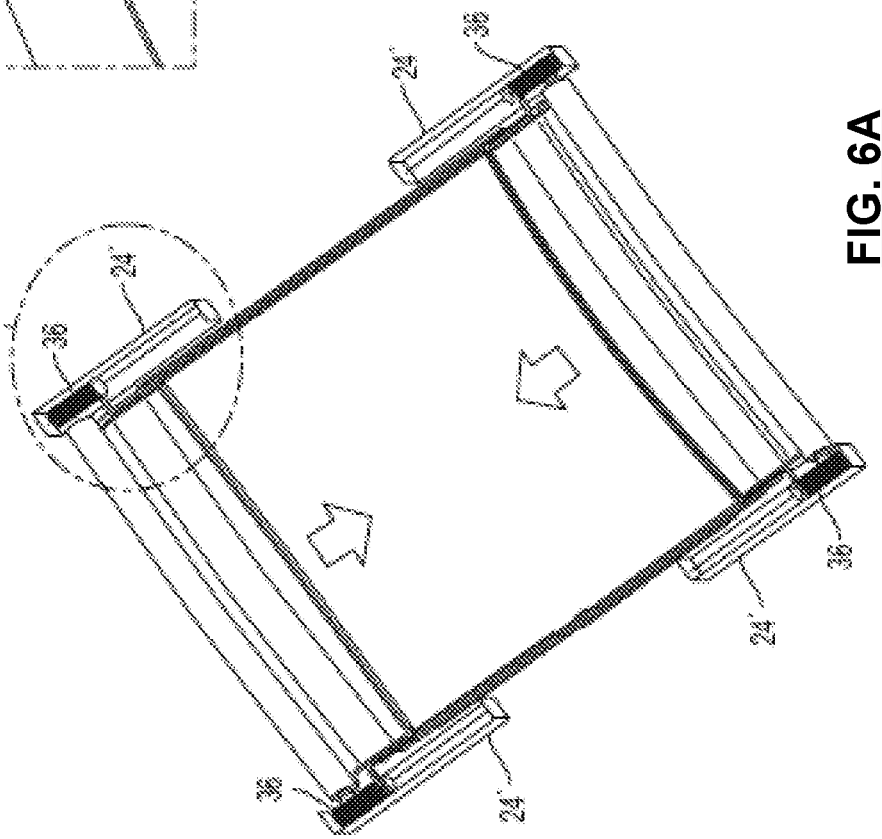
FIG. 6A shows a perspective view of an example containment system.

As shown in FIGS. 6A and 6B, each actuator 24' may include a housed spring 36 that deploys the shields 22 from the corresponding ones of the housings 20. For example, the actuators 24' may release the respective springs 36 in response to receipt of the deployment signal and allow the spring 36 and the pin 26 (and therefore the shields 22) to move along the guide channels 18 toward the middle location of the guide channels 18.

As shown in FIGS. 7A and 7B, the shields 22 may have a shingled flaps configuration where each of the shields 22 includes numerous rectangular flap sections which overlap while within the housings 20. Upon deployment, the flaps each move laterally along the guide channels 18 to spread apart into a shingled manner (i.e., in which a minority portion of each flap overlaps an adjacent flap), until the shields 22 fully cover the opening 14.

As shown in FIGS. 8A and 8B, the shields 22 may be embodied to be folded into a Z-type (or Z-fold) where the shields 22 are sectionally folded into flaps while within housing 20. Upon deployment, the folds are drawn out laterally along the guide channels 18 to spread out flat in a planar manner until the shields 22 fully cover the opening 14.

As shown in FIG. 9, scissor lever mechanisms 38 (toggle type) may be connected to the housings 20 and the shields 22 (e.g., via the pins 26). The scissor lever mechanisms 38 may help stabilize (and equalize) movement of the shields 22 during deployment while the shields 22 traveling along the guide channels 18. The scissor lever mechanisms 38 may additionally or alternatively support smooth travel of the shields 22 and help prevent jamming during travel. For example, the scissor lever mechanisms 38 may be constructed from linked, folding support beams having a criss-cross 'X' pattern. While one example scissor lever mechanism is shown, another type of scissor lever mechanism may be used.

As shown in FIG. 10A, the front containment system 105 may include pulleys 40 that assist in the deployment of the shields 22. As such, each of the actuators 24 is configured to pull on a corresponding line 42 that is wrapped around one of the pulleys 40 to cause deployment of one of the shields 22. In FIG. 10A, the actuator 24 may be considered to have a normally-open (NO) configuration.

With reference to FIGS. 10B through 10E, the front containment system 105 may include one or more types of locking mechanisms 44, 46 that lock the shields 22 together after meeting with each other in the middle of the guide channels 18. The locking mechanisms 44, 46 restrict the shields 22 from movement once locked.

The locking mechanisms 44, 46 may be disposed, for example, in the guide channels 18, along the ends of the shields 22, or at the location where the shields 22 meet. The locking mechanisms 44, 46 lock the shields 22 together after they have met in the middle.

For example, the locking mechanism 44 may be embodied as a snap locking system in which a male snap locking tab 44a inserts into and interlocks with a female snap locking tab 44b, as shown in FIG. 10B. Force from the actuator inserts the male snap locking tab 44a into female snap locking tab 44b.

As shown in FIGS. 10C and 10D, the locking mechanism 46 may include a spring biased lock pin 46a, located on the sides of the guide channels 18, that insertably interlocks into a notch 46b that is located on the sides of the end edges of each of the shields 22. Each of the guide channels 18 may include two spring biased lock pins 46a to insert into two corresponding notches 46b on each of the shields 22. End edges of each of the shields 22 may be hemmed with a rod 50, such as a sheet metal rod, for example, for stiffness purposes.

As shown in FIG. 10E and 10F, the locking mechanism may be embodied as a structural guide member located along the body of each of the guide channels 18. The locking mechanism may operate in similarly to a seatbelt pretensioner where the structural guide channels 18 restrict each of the shields 22 from moving in a reverse lateral direction after traveling along the guide channels in the direction 28.

As shown in FIGS. 11A and 11B, the front containment system 105 can incorporate an actuator and locking mechanism system embodied as a pair of inflatable tubes 52 operatively connected to a pair of inflator devices 54 and anchor points 56. After the shields 22 travel along the guide channels 18, the inflator devices 54 may activate to inject gas into the inflatable tubes 52. The inflatable tubes 52 fill with the gas and expand until locking into position via the anchor points 56 so as to completely block off a gap between the ends of each of the shields 22.

While the example of two shields are shown and have been discussed, the front containment system 105 may include a single shield 22 or more than two shields. For example, an example implementation of the front containment system 105 including a single shield 22 to cover the opening 14 and a single inflatable tube 52 is shown in FIGS. 12A and 12B. While the example of the inflatable tube 52 and inflator device 54 is provided in FIGS. 12A and 12B, another actuator and/or locking mechanism may be used. The single shield 22 example operates in substantially the same manner as examples having two shields 22. In the example of the single shield 22, however, the single shield 22 (and the inflatable tube 52) covers all of the opening 14.

FIGS. 13 and 14 include examples of more than two shields. For example, as shown in FIG. 13, front containment system 105" may include four shields 22" that meet to close and cover the opening 14. To close the opening 14, the front containment system 105" may implement two sets of guide channels and two sets of DCS modules 16" with the sets being positioned to form a square or rectangle shape.

As shown in FIG. 14, front containment system 105''' may include six shields that meet to close opening 14. The six shields may be arranged in a fan-like configuration. To close the opening 14, the front containment system 105''' may implement multiple sets of guide channels and multiple sets of DCS modules 16''' with the sets being positioned to a fan shape or another suitable shape.

Figure 15:
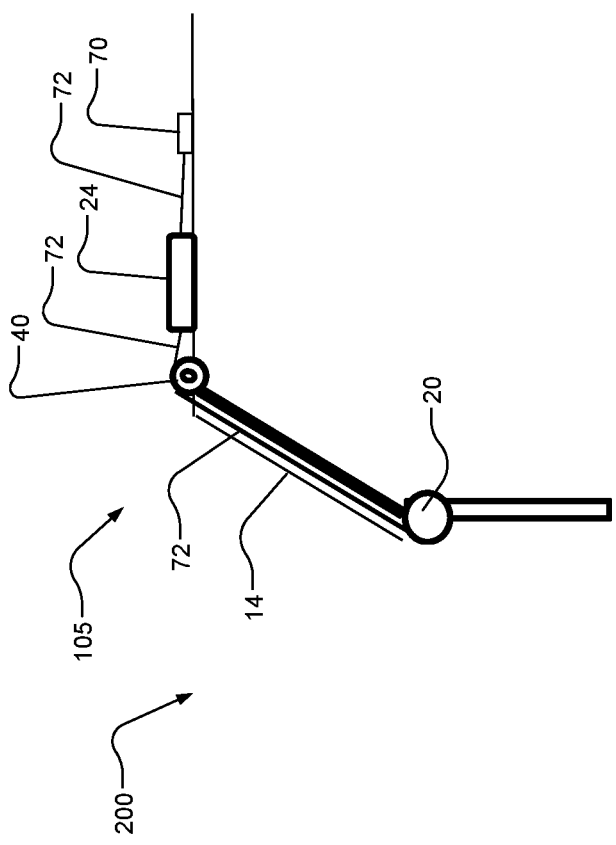
FIG. 15 is a perspective side view of an example containment system.

As stated above with respect to FIG. 10A, the front containment system 105 may include pulleys 40 that assist in the deployment of the shields 22. Another example implementation of the front containment system 105 including the pulleys 40 is illustrated by FIG. 15 and FIG. 2A. The actuators 24 and locking mechanisms 70 may be implemented at a roof panel of the vehicle. First ends of the locking mechanisms 70 (e.g., 44b, 46b) may be fixed to or part of the roof panel. Second ends (e.g., 44a, 46a) of the locking mechanisms 70 may be attached to lines 72 and are moveable by the actuators 24 to be locked to the first ends of the locking mechanisms 70. The actuators 24 may be the type described above or another type of actuator. The locking mechanisms 70 may be the type described above or another type of locking mechanism. In various implementations, the locking mechanisms 70 may be normally unlocked (or normally open), and the actuators 24 may pull lines 72 to deploy the shield(s) 22 and to lock the locking mechanisms 70. Alternatively, the locking mechanisms 70 may be normally locked (or normally closed), and the actuators 24 may impose force to unlock the locking mechanisms 70 to deploy the shield(s) 22.

Figure 16:
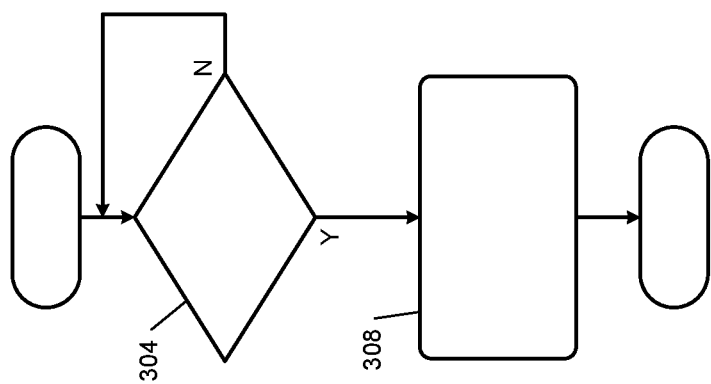
FIG. 16 is a flow chart depicting an example method of deploying a containment system.

FIG. 16 is a flowchart depicting an example method of deploying the shield(s) 22 while the vehicle is on. Control may begin with 304 where the triggering module 116 (FIG. 1) determines whether one or more conditions are satisfied for deploying the front containment system 105. For example, the triggering module may determine whether a frontal impact event or a rear impact event is occurring or will occur. The triggering module 116 may determine that frontal impact event or a rear impact event based on signals from the sensors 104.

If 304 is true, the triggering module 116 generates the deployment signal, and control continues with 308. If 304 is false, the deployment module 120 does not deploy the shields 22, and control may remain at 304. At 308, in response to the deployment signal, the deployment module 120 actuates the actuators 24 and triggers deployment of the shield(s) 22. The shield(s) 22 move along the guide channels 18 and block the opening 14. The locking mechanisms lock to limit movement of the shields 22.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A deployable containment system of a vehicle, comprising:
    a pair of guide channels that surround an opening facing one of a forward direction of travel of the vehicle and a backward direction of travel of the vehicle, wherein each of the guide channels has a first end and a second end;
    a housing mounted to the first ends of the guide channels;
    a shield configured to:
        deploy from the housing;
        travel along the guide channels toward the second ends of the guide channels; and
        cover at least a portion of the opening; and
    an actuator configured to, in response to being triggered, deploy the shield from the housing and move the shield along the guide channels toward the second ends of the guide channels.

2. The deployable containment system of claim 1, further comprising one or more locking mechanisms configured to lock when the shield has covered at least the portion of the opening.

3. The deployable containment system of claim 1, wherein the actuator comprises a spring configured to urge the shield toward the second ends of the guide channels.

4. The deployable containment system of claim 1 wherein the actuator comprises a pyrotechnic device configured to ignite and deploy the shield.

5. The deployable containment system of claim 1, wherein the actuator comprises an inflator configured to inflate and urge the shield toward the second ends of the guide channels.

6. The deployable containment system of claim 1, wherein the shield is wound around a winding shaft while in the housing and unwinds during deployment.

7. The deployable containment system of claim 1 further comprising a deployment module configured to trigger the actuator in response to identification of an impact event of a front end of the vehicle with an object.

8. The deployable containment system of claim 7 further comprising:
    at least one of a radar sensor, a camera, and a light imaging distance and ranging (LIDAR) sensor configured to identify objects in the one of the forward direction of travel of the vehicle and the backward direction of travel of the vehicle; and
    a triggering module configured to identify the impact event of the front end of the vehicle with the object based on signals from the at least one of the radar sensor, the camera, and the LIDAR sensor.

9. The deployable containment system of claim 1 further comprising a deployment module configured to trigger the actuator in response to identification of an impact event of a rear end of the vehicle with an object.

10. The deployable containment system of claim 9 further comprising:
    at least one of a radar sensor, a camera, and a light imaging distance and ranging (LIDAR) sensor configured to identify objects in the one of the forward direction of travel of the vehicle and the backward direction of travel of the vehicle; and
    a triggering module configured to identify the impact event of the rear end of the vehicle with the object based on signals from the at least one of the radar sensor, the camera, and the LIDAR sensor.

11. The deployable containment system of claim 1 further comprising:
    a second actuator configured to, in response to being triggered, in cooperation with the actuator, deploy the shield from the housing and move the shield along the guide channels toward the second ends of the guide channels.

12. The deployable containment system of claim 1 further comprising:
    a second housing mounted to the second ends of the guide channels;
    a second shield configured to:
        deploy from the second housing;

travel along the guide channels toward the first ends of the guide channels; and
cover at least a second portion of the opening; and
a second actuator configured to, in response to being triggered, deploy the second shield from the second housing and move the second shield along the guide channels toward the first ends of the guide channels.

13. The deployable containment system of claim 1 further comprising a front windshield that is located within the opening.

14. A vehicle, comprising:
the deployable containment system of claim 1, wherein the opening faces the forward direction of travel of the vehicle; and
a second deployable containment system, comprising:
a second pair of guide channels that surround a second opening facing the backward direction of travel of the vehicle,
wherein each guide channel of the second pair of guide channels has a third end and a fourth end;
a second housing mounted to the third ends of the guide channels of the second pair of guide channels;
a second shield configured to:
deploy from the second housing;
travel along the guide channels of the second pair of guide channels toward the fourth ends of the guide channels of the second pair of guide channels; and
cover at least a portion of the second opening; and
a second actuator configured to, in response to being triggered, deploy the second shield from the second housing and move the second shield along the guide channels of the second pair of guide channels toward the fourth ends of the guide channels of the second pair of guide channels.

15. The vehicle of claim 14 further comprising a deployment module configured to trigger the actuator and the second actuator in response to identification of one of:
a first impact event of a front end of the vehicle with a first object; and
a second impact event of a rear end of the vehicle with a second object.

16. The vehicle of claim 15 further comprising:
at least one of a radar sensor, a camera, and a light imaging distance and ranging (LIDAR) sensor configured to identify objects in the one of the forward direction of travel of the vehicle and the backward direction of travel of the vehicle; and
a triggering module configured to identify the first impact event of the front end of the vehicle with the first object and the second impact event of the rear end of the vehicle with the second object based on signals from the at least one of the radar sensor, the camera, and the LIDAR sensor.

17. The vehicle of claim 14 further comprising a deployment module configured to, in response to identification of an impact event of a front end of the vehicle with an object, trigger the actuator and not trigger the second actuator.

18. The vehicle of claim 14 further comprising a deployment module configured to, in response to identification of an impact event of a rear end of the vehicle with an object, not trigger the actuator and trigger the second actuator.

19. The vehicle of claim 14 wherein:
the deployable containment system further comprises:
a third housing mounted to the second ends of the guide channels;
a third shield configured to:
deploy from the third housing;
travel along the guide channels toward the first ends of the guide channels; and
cover at least a second portion of the opening; and
a third actuator configured to, in response to being triggered, deploy the third shield from the third housing and move the third shield along the guide channels toward the first ends of the guide channels; and
the second deployable containment system further comprises
a fourth housing mounted to the fourth ends of the guide channels of the second pair of guide channels;
a fourth shield configured to:
deploy from the fourth housing;
travel along the guide channels of the second pair of guide channels toward the third ends of the guide channels of the second pair of guide channels; and
cover at least a second portion of the second opening; and
a fourth actuator configured to, in response to being triggered, deploy the fourth shield from the fourth housing and move the fourth shield along the guide channels of the second pair of guide channels toward the third ends of the guide channels of the second pair of guide channels.

20. A vehicle comprising:
a first pair of guide channels that surround a first opening facing a forward direction of travel of the vehicle,
wherein each guide channel of the first pair of guide channels has a first end and a second end;
a first housing mounted to the first ends of the guide channels;
a first shield configured to:
deploy from the first housing;
travel along the guide channels toward the second ends of the first guide channels; and
cover at least a portion of the first opening;
a first actuator configured to, in response to being triggered, deploy the first shield from the first housing and move the first shield along the first guide channels toward the second ends of the first guide channels;
a second pair of guide channels that surround a second opening facing a backward direction of travel of the vehicle,
wherein each guide channel of the second pair of guide channels has a third end and a fourth end;
a second housing mounted to the third ends of the guide channels of the second pair of guide channels;
a second shield configured to:
deploy from the second housing;
travel along the guide channels of the second pair of guide channels toward the fourth ends of the guide channels of the second pair of guide channels; and
cover at least a portion of the second opening;
a second actuator configured to, in response to being triggered, deploy the second shield from the second housing and move the second shield along the guide channels of the second pair of guide channels toward the fourth ends of the guide channels of the second pair of guide channels;
a deployment module configured to trigger at least one of the first actuator and the second actuator in response to identification of an impact event of one of a front end of the vehicle with an object and a rear end of the vehicle with an object;
at least one of a radar sensor, a camera, and a light imaging distance and ranging (LIDAR) sensor configured to identify objects in the forward direction of travel of the vehicle and objects in the backward direction of travel of the vehicle; and
a triggering module configured to identify the impact event based on signals from the at least one of the radar sensor, the camera, and the LIDAR sensor.

\* \* \* \* \*